United States Patent
Nikhil et al.

(10) Patent No.: US 10,521,312 B1
(45) Date of Patent: Dec. 31, 2019

(54) DOWNTIME MANAGEMENT DURING DATABASE INSTANCE PATCHING

(71) Applicant: Amazon Technologies, Inc., Reno, NV (US)

(72) Inventors: Alok Nandan Nikhil, Seattle, WA (US); Bohan Liu, Seattle, WA (US); Mushahid Alam, Seattle, WA (US); Tengiz Kharatishvili, Sammamish, WA (US); Saileshwar Krishnamurthy, Palo Alto, CA (US); Alexandre Olegovich Verbitski, Woodinville, WA (US); Kamal Kant Gupta, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 15/462,277

(22) Filed: Mar. 17, 2017

(51) Int. Cl.
*G06F 9/44* (2018.01)
*G06F 11/14* (2006.01)
(Continued)

(52) U.S. Cl.
CPC .......... *G06F 11/1469* (2013.01); *G06F 16/21* (2019.01); *G06F 16/23* (2019.01); *G06F 16/2365* (2019.01); *H04L 61/2007* (2013.01); *H04L 67/02* (2013.01); *G06F 2201/80* (2013.01)

(58) Field of Classification Search
CPC ...... G06F 11/1469; G06F 16/21; G06F 16/23; G06F 16/2365; G06F 2201/80; H04L 61/2007; H04L 67/02
See application file for complete search history.

(56) References Cited

U.S. PATENT DOCUMENTS

2006/0190581 A1* 8/2006 Hagale ................ G06F 9/5061
709/223
2008/0010432 A1* 1/2008 Kasuya ................ G06F 9/4843
711/202
(Continued)

OTHER PUBLICATIONS

Yingjun We et al., Fast Failure Recovery for Main-Memory DBMSs on Multicores, ACM, 2017, retrieved online on Aug. 21, 2019, pp. 267-281. Retrieved from the Internet: <URL: http://delivery.acm.org/10.1145/3070000/3064011/p267-wu.pdf?>. (Year: 2017).*

*Primary Examiner* — Hanh Thi-Minh Bui
(74) *Attorney, Agent, or Firm* — Lowenstein Sandler LLP

(57) ABSTRACT

A system for updating a database instance with a patch or new binary image. A database instance includes a database engine and a client-side storage layer driver to manage database state information and volume geometry state information associated with client process connections to a volume of a storage layer of a database system during the patching process. The database engine and the client-side storage service driver save database state information and volume geometry state information, execute the new binary image, and restore the updated database engine with the database state information and volume geometry state information. The new binary image may be executed using a fork/exec model, wherein file descriptors used to identify sockets used in existing client connections are preserved, enabling restoration of the client connections without interruption or downtime.

19 Claims, 10 Drawing Sheets

(51) Int. Cl.
*H04L 29/12* (2006.01)
*H04L 29/08* (2006.01)
*G06F 16/21* (2019.01)
*G06F 16/23* (2019.01)

(56) References Cited

U.S. PATENT DOCUMENTS

| | | | | |
|---|---|---|---|---|
| 2013/0191847 | A1* | 7/2013 | Sirota | G06F 9/485 |
| | | | | 718/108 |
| 2016/0357549 | A1* | 12/2016 | Buzsaki | G06F 8/65 |
| 2017/0048163 | A1* | 2/2017 | Pan | G06F 9/46 |
| 2017/0131913 | A1* | 5/2017 | Gordon | G06F 3/065 |

* cited by examiner

DOWNTIME MANAGEMENT DURING DATABASE INSTANCE PATCHING

BACKGROUND

Patching of database instances with a newer version of the database traditionally results in downtime for associated application software. Traditionally, client communication with the database instance subject to the patching is interrupted. The unavailability of the application software presents an issue for since the downtime leads to an unavailability period or maintenance period for associated customers or users.

To this end, conventional methods involve shutdown of the database instance, execution of the patching process, and restart of the new version of the database instance. During the patching process, a client can no longer successfully send requests to the database instance, such that any new connection requests are left hanging and unfulfilled.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
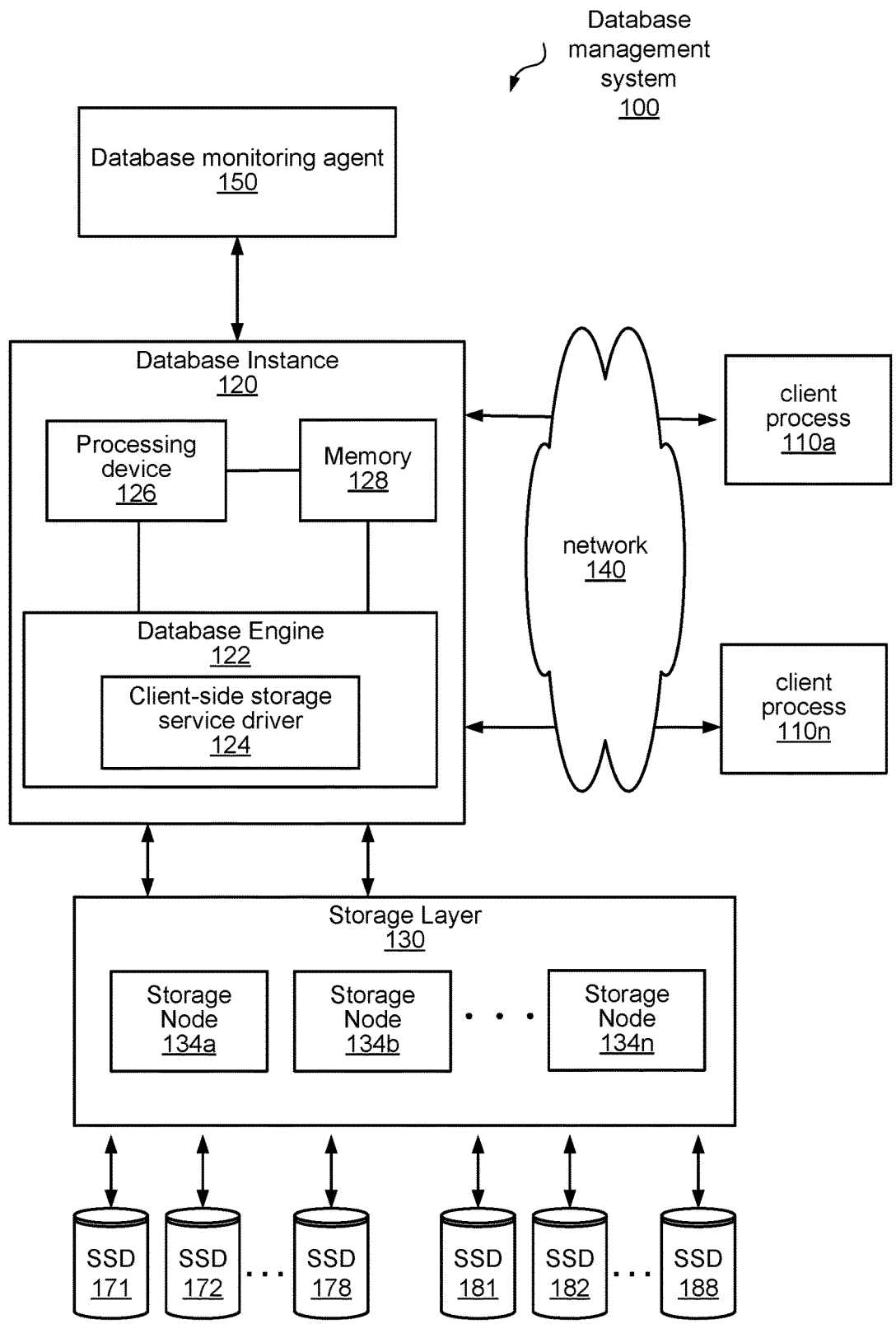
FIG. 1 illustrates an example database management system to perform a managed downtime patching process, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to updating a database instance with a new binary image or patch. In one embodiment, a database instance includes a database engine and a client-side storage layer driver (also referred to as the "client-side driver") configured to manage client process connections to a storage layer of a database system during the patching process. In one embodiment, a process is described wherein the database engine and the client-side storage service driver save database state information and volume geometry state information, execute the new binary image, and restore the updated database engine with the database state information and volume geometry state information. In one embodiment, the database state information includes server file descriptors including information identifying sockets used in existing client connections with the storage layer. In one embodiment, the database state information includes client connection properties associated with existing client connections with the storage layer.

The embodiments described herein may, in some embodiments, implement a database management system that enables clients (e.g., customers) to establish and maintain connections to a storage layer associated with the database engine. In one embodiment, the database engine and client-side storage service driver coordinate to perform checks to enable restoration of client connections without interruption during the patching process. In one embodiment, the database engine and client-side driver identify a safe "checkpoint" condition or state by verifying that the existing client connections are persisted or preserved to the saving of the database state information and volume geometry state information and safe execution of the new binary image. In one embodiment, upon reaching the checkpoint, the database engine coordinates with a scheduler to pause new connections and places new connection requests in a "wait" mode. In one embodiment, the database engine instructs the client-side storage service driver to save volume geometry state information that may be used to reconstruct the volume geometry.

In one embodiment, the database engine and the client-side storage service driver may be updated with the new binary image in response to the issuance of a new database engine version (e.g., a new or updated binary image) by a database monitoring agent. In one embodiment, the new binary image (or patch) may be deployed by the database monitoring agent either in a maintenance window or in view of a user request.

In one embodiment, the database engine and the client-side driver employ a model wherein an executing process spawns a new process (also referred to as a "fork/exec call") to execute the new binary image. In one embodiment, the new or child process of the fork/exec may open the storage layer volume and use the stored volume geometry state information and restore the stored database state information to maintain the existing database connections. In one embodiment, the fork/exec call is a system call that causes a parent process to divide itself (e.g., "fork" into two identical processes), thereby creating child process that is an exact copy of the parent process except for the return value. In one embodiment, after creating the new or child process, the parent process may kill itself. In one embodiment, the described patching process (also referred to as a "managed downtime patching process") enables the execution of the new binary image by the database instance such that downtime of application software is managed (e.g., reduced or eliminated), wherein existing client connections are maintained throughout the patching process. In one embodiment, the managed downtime patching process includes pausing and resuming existing client connections during the patching, without dropping the client connections. In one embodiment, advantageously, patching of high availability databases is improved, enabling users (e.g., customers) to have database instances patched without downtime of associated application software and the loss of client connections to the database.

FIG. 1 is a block diagram illustrating various components of a database management environment, according to one embodiment. In one embodiment, the database management system 100 manages the updating of one or more database instances 120 with a new binary image (or patch). In one embodiment, the database management system 100 may include a database monitoring agent 150, one or more database instances 120, and a storage layer 130.

In one embodiment, the database instance 120 may include a database engine 122 and an operatively coupled client-side storage layer driver 124 (also referred to as the "client-side driver"). The database instance may further include a processing device 126 and a memory 128 configured to execute and store instructions associated with the functionality of the database engine 122 and the client-side driver 124, as described in greater detail below in connection with FIGS. 2-9.

In some embodiments, the client-side storage service driver running on the database engine 122 may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. In one embodiment, when a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In one embodiment, the database engine 122 may receive read and/or write requests from various client processes (e.g., programs, applications, and/or subscribers (users)) and parse the requests to develop an execution plan to carry out the associated database operation(s). In some embodiments, the database engine 122 manages communications between the storage layer 130 and the client processes 110, as well as communications with the client-side driver 124.

In one embodiment, one or more client processes 110 (e.g., client process 110a and client process 110n) may establish client connections with the database instance and associated storage layer 130 via network 140. For example, the one or more client processes may send database query requests (which may include read and/or write requests targeting data stored on one or more of the storage nodes 134a-134n of the storage layer 130) and receive database query responses from the database instance (e.g., responses that include write acknowledgements and/or requested data). As illustrated in FIG. 1, storage layer 130 may store data blocks on storage nodes 134a-134n, each of which may have multiple attached SSDs.

In one embodiment, the storage nodes 134a-134n may represent a virtual machine on which storage node server code is deployed. In an example, each storage node 134a-134n may have multiple locally attached SSDs (e.g., SSDs 171-188 in FIG. 1), and may provide a network API for access to one or more segments. As used herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes wherein each volume is split into and striped across multiple segments, and/or a single drive may be broken up into multiple volumes simply for ease of management, in different embodiments. In some embodiments, each SSD may store an allocation map at a single fixed location.

In one embodiment, the storage nodes 134a-134n may be represented by a storage volume geometry (or "volume geometry"). In one embodiment, the volume geometry is a logical concept representing a highly durable unit of storage that a user/client/application of the storage system understands. In one embodiment, the volume geometry may include the one or more IP addresses of one or more storage devices and storage partition metadata.

In one embodiment, a volume may be a distributed store that appears to the user/client/application as a single consistent ordered log of write operations to various user pages of a database table. For example, each write operation may be encoded in a User Log Record (ULR), which represents a logical, ordered mutation to the contents of a single user page within the volume. In one embodiment, each ULR may include a unique LSN, or Logical Sequence Number. In one embodiment, each ULR may be persisted to one or more synchronous segments in the distributed store that form a Protection Group (PG), to provide high durability and availability for the ULR. In one embodiment, a volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of volume extents. In one embodiment, reads and writes that are directed to a volume may be mapped into corresponding reads and writes to the constituent volume extents. In some embodiments, the size of a volume may be changed by adding or removing volume extents from the end of the volume.

In one embodiment, the storage layer 130 may include one or more segments representing a limited-durability unit of storage assigned to a single storage node. In one embodiment, a segment provides limited best-effort durability (e.g., a persistent, but non-redundant single point of failure that is a storage node) for a specific fixed-size byte range of data. In one embodiment, within a storage node 134*a*-134*n*, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment). In some embodiments, storage layer 130 may provide high durability for stored data block through the application of various types of redundancy schemes.

Figure 2:
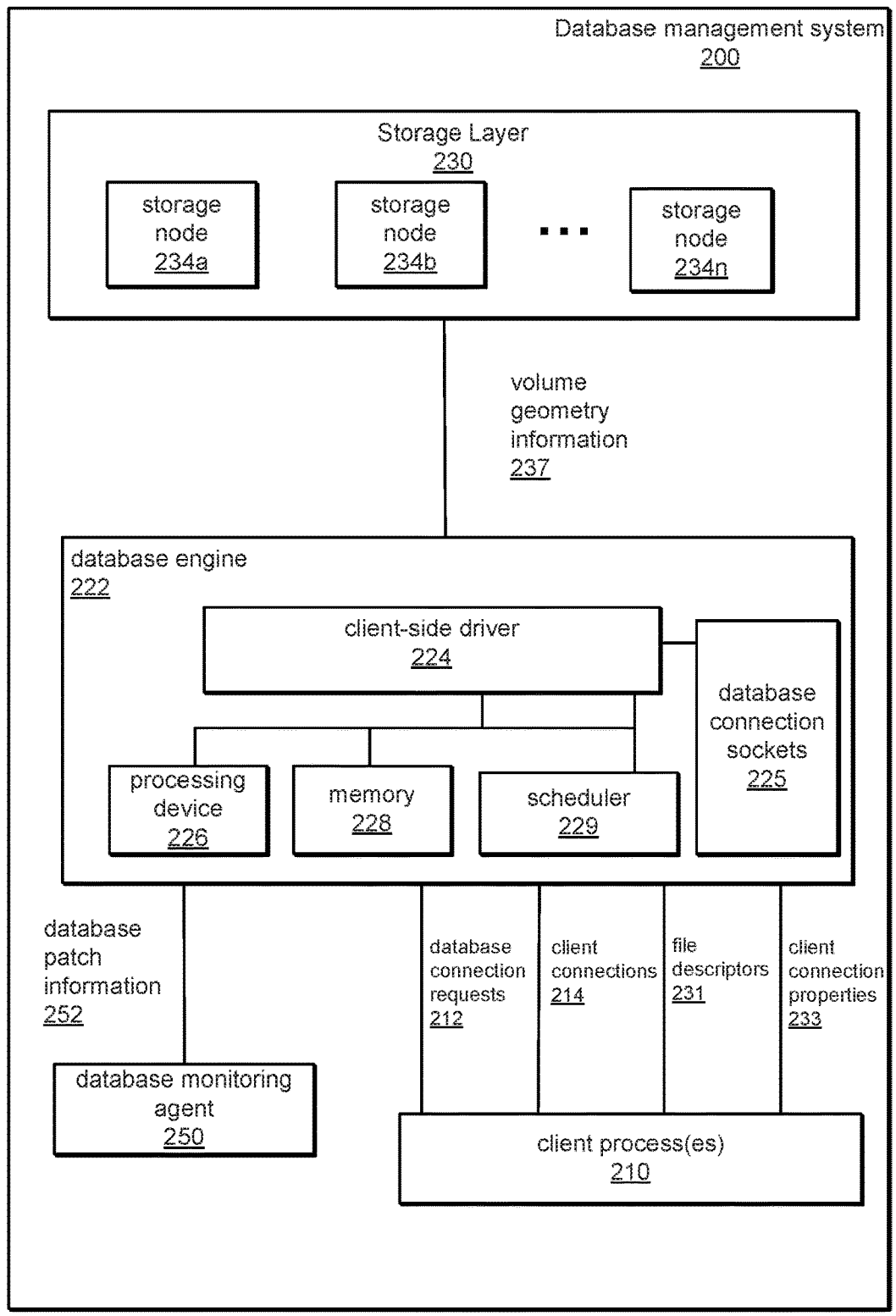
FIG. 2 is a block diagram illustrating a database management system to perform a managed downtime patching process, according to one embodiment.

FIG. 2 is a block diagram illustrating various components of a database management system 200, according to one embodiment. In one embodiment, the database management system 200 manages the updating of a database engine 222 of a database instance with a new binary image (or patch) based on database patch information 252 received from a database monitoring agent 250. In one embodiment, the database monitoring agent 250 may be a Relational Database Service (RDS) host server configured to monitor the patching processes executed by the database engine 222 and the client-side driver 224. According to embodiments, the database monitoring agent 250 may initiate the installation of a new binary image (e.g., a collection of process binaries (e.g., executables) and libraries by the database instance. In one embodiment, the managed downtime patching process executed by the database engine 222 and the client-side driver 224 may be initiated by a request including the database patch information received from the database monitoring agent 250. In one embodiment, the patch request may be triggered by a maintenance window or by a user request.

In one embodiment, instructions associated with the managed downtime patching process may be stored in a memory 228 for execution by an operatively coupled processing device 226. In one embodiment, the client-side driver 224 acts as a proxy between the database engine 222 and the storage layer 230. In one embodiment, the client-side driver 224 stores volume geometry information 237 associated with a volume of the storage layer 230 and storage nodes 234*a*-234*n*. In one embodiment, the client-side storage service driver saves (i.e., dumps or stores) the volume geometry information 237 data and uses the stored volume geometry information 237 to reconstruct the volume geometry during the managed downtime patching process, as described in greater detail below. In one embodiment, the volume geometry information may include the one or more IP addresses of one or more storage devices and storage partition metadata (e.g., volume metadata). In one embodiment, the client-side driver 224 may also save storage layer volume recovery state information including, for example, one or more of volume durable logical sequence number (VDL) information, S3DL information, protection group durable LSN (PGDL) information, and volume truncation epochs. As described in greater detail below, the client-side driver 224 saves volume geometry state information including the volume geometry information 237 and, optionally, the storage layer volume recovery state information (e.g., the VDL, S3DL, PGDL information, and volume truncation epoch information).

In one embodiment, the database engine 222 collects and stores file descriptors 231 and client connection properties 233. In one embodiment, the file descriptors (also referred to as "server file descriptors") include information that may be used to map and identify the database connection sockets 225 of the database engine 222 that are used in the client connections 214 (e.g., the client connections 214 between the client processes 210 and the database connection sockets 225 of the database engine 222). In one embodiment, the file descriptors include information identifying existing client connections to the storage layer. Since the client connections are mapped to the file descriptors, the file descriptors may be used to save and restore the client connections during the patching process.

In an example, file descriptors 231 include a small integer that a process uses in its read/write calls to identify a corresponding file. In one embodiment, the client connection properties 233 include information identifying the client connections 214 with the storage layer 230. For example, the client connection properties 233 may include one or more of a username used in the client connection, a hostname of a client machine on the client connection, access privileges of a user on the client connection, an IP address of a client machine on the client connection, a database name opened in a session of a client connection, a client connection file descriptor, and session variables. As described in greater detail below, during the managed downtime patching process, the database engine 222 saves (e.g., dumps or stores) the database state information including the file descriptors 231 and the client connection properties 233.

As shown in FIG. 2, the database engine 222 is operatively coupled to a scheduler 229 configured to process and schedule database connection requests 212 received from the client processes 210. In one embodiment, the database engine 222 may communicate with the scheduler 229 to send an instruction to pause the active client connections 214 and place new database connection requests 212 in a "wait" or "hold" mode (e.g., wherein the new database connection requests 212 are stored and await execution).

Figure 3:
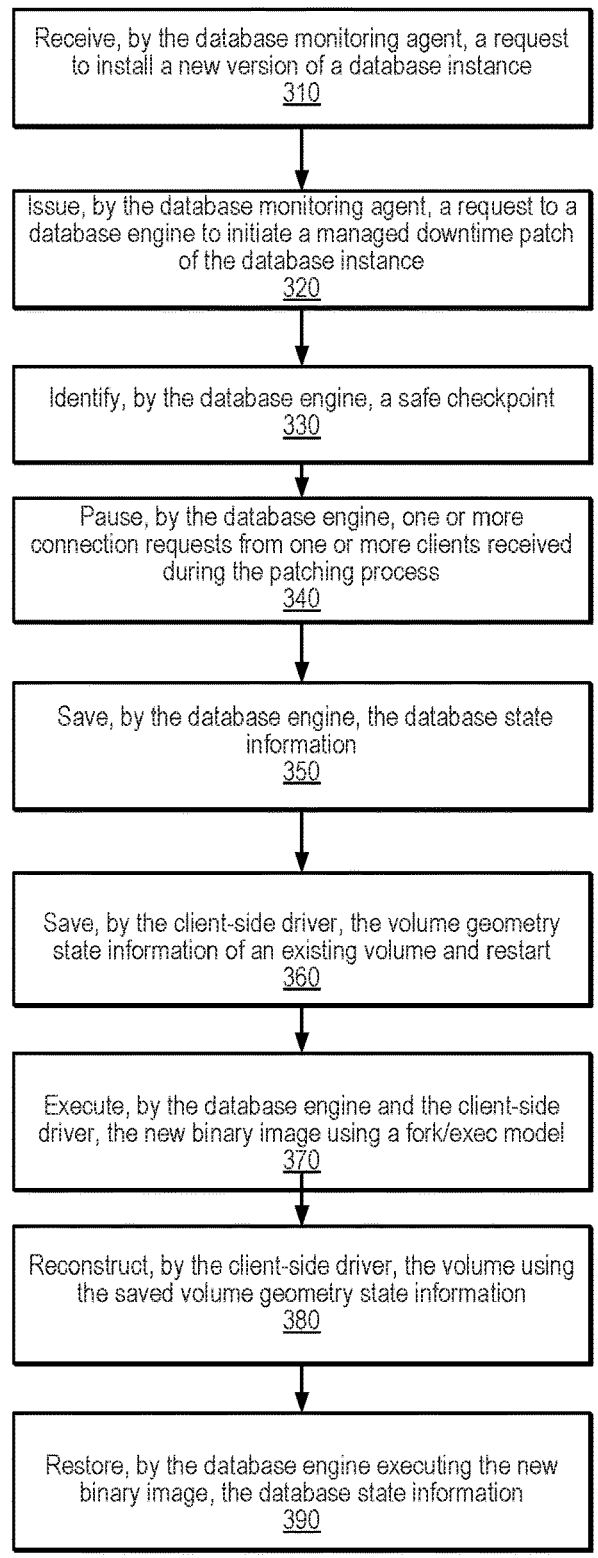
FIG. 3 is a flow diagram illustrating one embodiment of a managed downtime patching process, according to one embodiment.

FIG. 3 illustrates a flowchart that provides an example of a process 300 executed by a database management system (e.g., database management system 100 of FIG. 1 or database management system 200 of FIG. 2), according to various embodiments. It is understood that the flowchart of FIG. 3 provides an example of the many different types of functional arrangements that may be employed to implement the operation of the database management system 100, 200 including a database engine and a client-side storage service driver (e.g., database engine 122 and client-side storage service driver 124 of FIG. 1 or database engine 222 and client-side driver 224 of FIG. 2) as described herein. In one embodiment, the database engine and client-side storage service driver are associated with a database instance to be updated with a new binary image (e.g., a patch).

In block 310, a database monitoring agent (e.g., database monitoring agent 150 of FIG. 1) receives a request or other instruction relating to installation of a new binary image on a database instance. In one embodiment, installation of the new binary image includes replacing the process binary files (e.g., executables) and libraries of the database instance. In one embodiment, the patch installation may be triggered by a maintenance window or by a user request. In one embodiment, the database monitoring agent replaces the process file and libraries involved in the patch.

In block 320, the database monitoring agent issues a request (e.g., a call action) to the database engine to initiate the patching of the database instance. In one embodiment, the call action includes a request to initiate a managed downtime patch of the database instance. In block 330, the database engine identifies a safe checkpoint to initiate the managed downtime patching process. In one embodiment, the safe checkpoint represents a state wherein all client connections to the storage layer are preserved, thereby confirming no application downtime would result from the execution of the patch. In one embodiment, the identification of the safe checkpoint involves verification that there are no active (e.g., in-flight) or open transactions. In one embodiment, identification of the safe checkpoint further involves determining a highest allocated logical sequence number (LSN) is the current volume durable LSN (VDL). In one embodiment, if it is determined that the highest allocated LSN does not equal the current VDL, the database engine stops any further LSNs from being allocated and waits for the highest allocated LSN to be durable, thereby resulting in the highest allocated LSN equaling the current VDL. According to embodiments, an example process for identifying the safe checkpoint is described in further detail with reference to FIGS. 4 and 5.

In block 340, upon reaching the safe checkpoint, the database engine pauses one or more client connection requests from one or more client processes. In one embodiment, the client connection requests are paused by instructing the scheduler to store new database connection requests to be placed into "wait" mode. In block 350, the database engine saves the database state information. In block 360, the client-side driver saves the volume geometry state information of a volume of the storage layer associated with the database instance and restarts. In one embodiment, the client-side driver initiates the dumping or saving of the volume geometry state information and restart in response to an instruction from the database engine (e.g., the database engine sends a request to the client-side driver to save the volume geometry state information and restart).

In block 370, the database engine and the client-side driver execute the new binary image. In one embodiment, the database engine and the client-side driver each employ a fork/exec call to spawn child or new processes (e.g., a first child process of the database engine and a second child process of the client-side driver) to execute the new binary image. In one embodiment, in UNIX, a fork/exec model allows a process to replace its runtime using a new process image (e.g., the updated or new database server binary image).

In one embodiment, the database engine fork/execs the new binary image, restarts and waits for the client-side storage service driver to open a storage layer session. In one embodiment, the client-side storage service driver also fork/execs the new binary image and uses the file descriptors to listen on the corresponding database socket (e.g., RPC channels).

In block 380, the client-side driver restores the volume using the saved volume geometry state information. In one embodiment, accordingly, the previous volume is reconstructed with the prior state. In block 390, the database engine executing the new binary image, restores the opened volume (including the restored volume state) with the database state information. In one embodiment, after the database engine executes the new binary image and waits for the volume to be opened by the client-side driver, the database engine listens to the identified sockets and client connections, and restores the volume that was reconstructed by the client-side driver with the previously saved state information.

Figure 4:
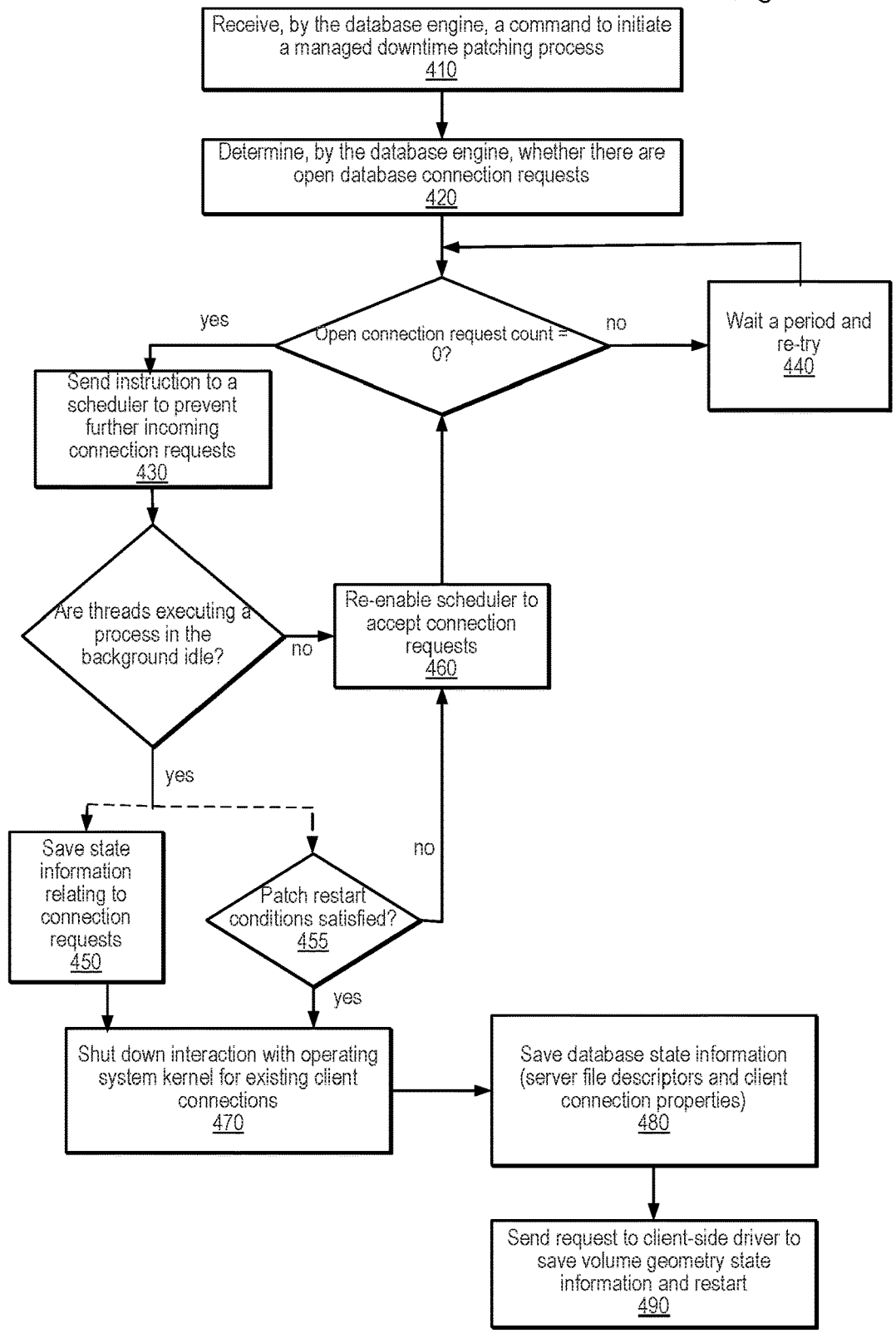
FIG. 4 depicts a flow diagram illustrating an example of a safe checkpoint identification process, according to one embodiment.

FIG. 4 illustrates a flowchart that provides an example of a process 400 executed by a database management system (e.g., database management system 100 of FIG. 1 or database management system 200 of FIG. 2), according to various embodiments. In one embodiment, the process 400 illustrated in FIG. 4 is directed to identifying a safe checkpoint in connection with execution of the managed downtime patching process. As detailed above, the safe checkpoint represents a state wherein it is deemed safe to initiate the managed downtime patching process. IN one embodiment, the identification of the safe checkpoint may be deemed a portion of the managed downtime patching process itself, wherein identification of the safe checkpoint enables the managed downtime patching process to proceed. In one embodiment, identification of the safe checkpoint establishes that client connections are preserved and that no application downtime is experienced as part of the patch update.

In block 410, the database engine receives a command, instruction or request to initiate a patch of the database instance to execute the new binary image. In one embodiment, the command includes a request to initiate a managed downtime patching process in association with the new binary image. In one embodiment, the command is received from a database monitoring agent (e.g., an RDS host manager).

In block 420, the database engine determines whether there are open client connection requests. In one embodiment, if it is determined that there are open client connection requests (i.e., the connection request count is greater than zero), the database engine waits a period of time and re-tries or re-checks the open transaction count, in block 440. In one embodiment, the period of time the database engine waits before re-trying may be any suitable length of time, such as, for example, 100 milliseconds.

In block 420, if it is determined that there are no open client connection requests (i.e., the client connection request count equals zero), process 400 proceeds to block 430. In block 430, the database engine sends an instruction to a scheduler to block or prevent the scheduling of further incoming connection requests. In one embodiment, the scheduler responds to the instruction by pausing further client connections and placing incoming connection requests in a "wait" mode.

In one embodiment, the database engine checks if there are threads executing a process in the background that are idle. If the threads are not idle (i.e., there is activity), the database engine sends an instruction to re-enable the scheduler to accept connection requests, in block 460. In one embodiment, the scheduler is re-enabled and the process returns to block 420 to determine whether there are open client connection requests. In one embodiment, this portion of the process continues until it is determined that there are no open connection requests and the threads executing one or more processes in the background are idle.

In one embodiment, upon determining that the threads executing one or more processes in the background are idle, process 400 proceeds either to block 450 or block 455. In one embodiment, in block 450, the database engine saves the state information relating to the connection requests. In one embodiment, process 400 proceeds to block 455 and determines if patch restart conditions are satisfied, as described in detail below in connection with process 500 of FIG. 5.

In block 470, following one or more of the saving of the state information relating to the connection requests (in block 450) or the satisfaction of the patch restart conditions (in block 455), process 400 proceeds to block 470. In block 470, the database engine shuts down interaction with an operating system kernel for existing client connections. In one embodiment, the database engine shuts down the epoll application programming interface (API) for the existing client connections. In one embodiment, the epoll API is responsible for monitoring multiple file descriptors to determine if I/O is possible.

In block 480, having identified the safe checkpoint, the database engine saves the database state information (e.g., the server file descriptors and client connection properties). In block 490, the database engine sends a request to the client-side driver to save the volume geometry state information and restart.

Figure 5:
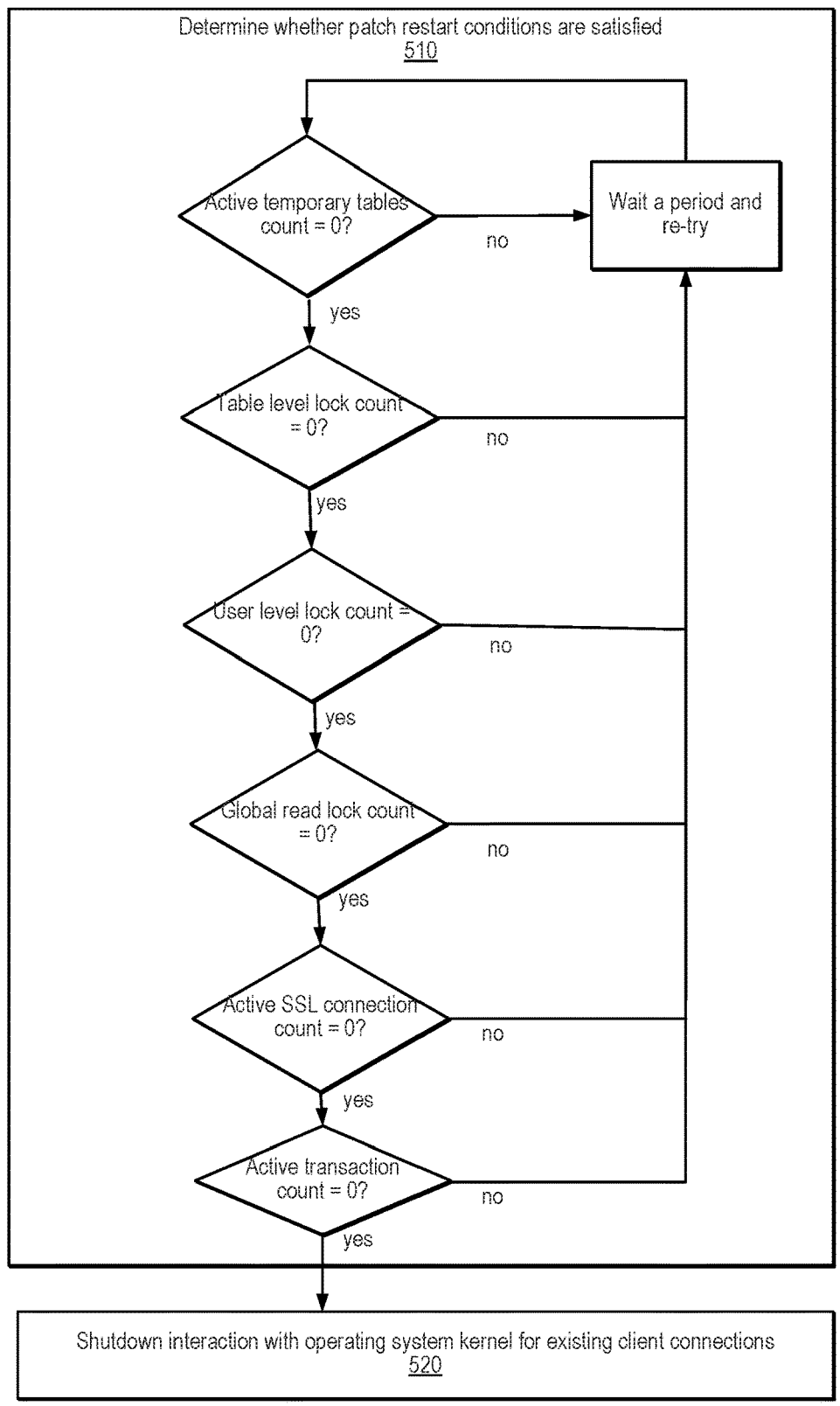
FIG. 5 depicts a flow diagram illustrating an example of a patch condition checking process, according to one embodiment.

FIG. 5 illustrates a flowchart that provides an example of a process 500 executed by a database management system (e.g., database management system 100 of FIG. 1 or database management system 200 of FIG. 2), according to various embodiments. In one embodiment, the process 500 illustrated in FIG. 5 is directed to determining, by a database engine, whether certain patch restart conditions are satisfied (e.g., block 455 of FIG. 4) as part of the safe checkpoint identification process illustrated in FIG. 4.

In block 510, the database engine determines whether the patch restart conditions are satisfied. If one or more of the patch restart conditions are not met, the database ending may wait a period of time and re-check the condition. In one embodiment, the period of time the database engine waits before re-trying may be any suitable length of time (e.g., 100 milliseconds, 1 second, 2 seconds, etc.) In one embodiment, although certain patch conditions are illustrated in FIG. 5 and described herein, it is noted that additional patch conditions may be checked. In one embodiment, any one or more of the patch conditions described herein may be performed (e.g., any combination of two or more of the identified patch conditions may be checked). In addition, although FIG. 5 illustrates the patch conditions being checked in a serial manner, the patch conditions may be checked in parallel and in any order.

As shown in FIG. 5, block 510 includes a check of one or more of the following patch conditions: a determination if there are any active temporary tables (i.e., is the active temporary table count equal to zero), a determination if there are any active table level locks (i.e., is the table level lock count equal to zero), a determination if there are any active user level locks (i.e., is the user level lock count equal to zero), a determination if there are any active global read locks (i.e., is the active global read lock count equal to zero), a determination if there are any active secure sockets layer (SSL) connections (i.e., is the active SSL connection count equal to zero), and a determination if there are any active transactions (i.e., is the active transaction count equal to zero). In one embodiment, if each of the one or more patch conditions checked by the database engine (e.g., any of the one or more patch conditions identified above) are satisfied, the database engine shuts down interaction with the operating system kernel for the existing client connections, in block 520 (i.e., as shown in block 470 of FIG. 4). In one embodiment, any one of the identified patch conditions or any combination of the identified patch conditions may be checked in block 510. In one embodiment, additional patch conditions beyond the ones enumerated herein may be checked in addition to or instead of the example patch conditions identified in connection with FIG. 5.

Figure 6:
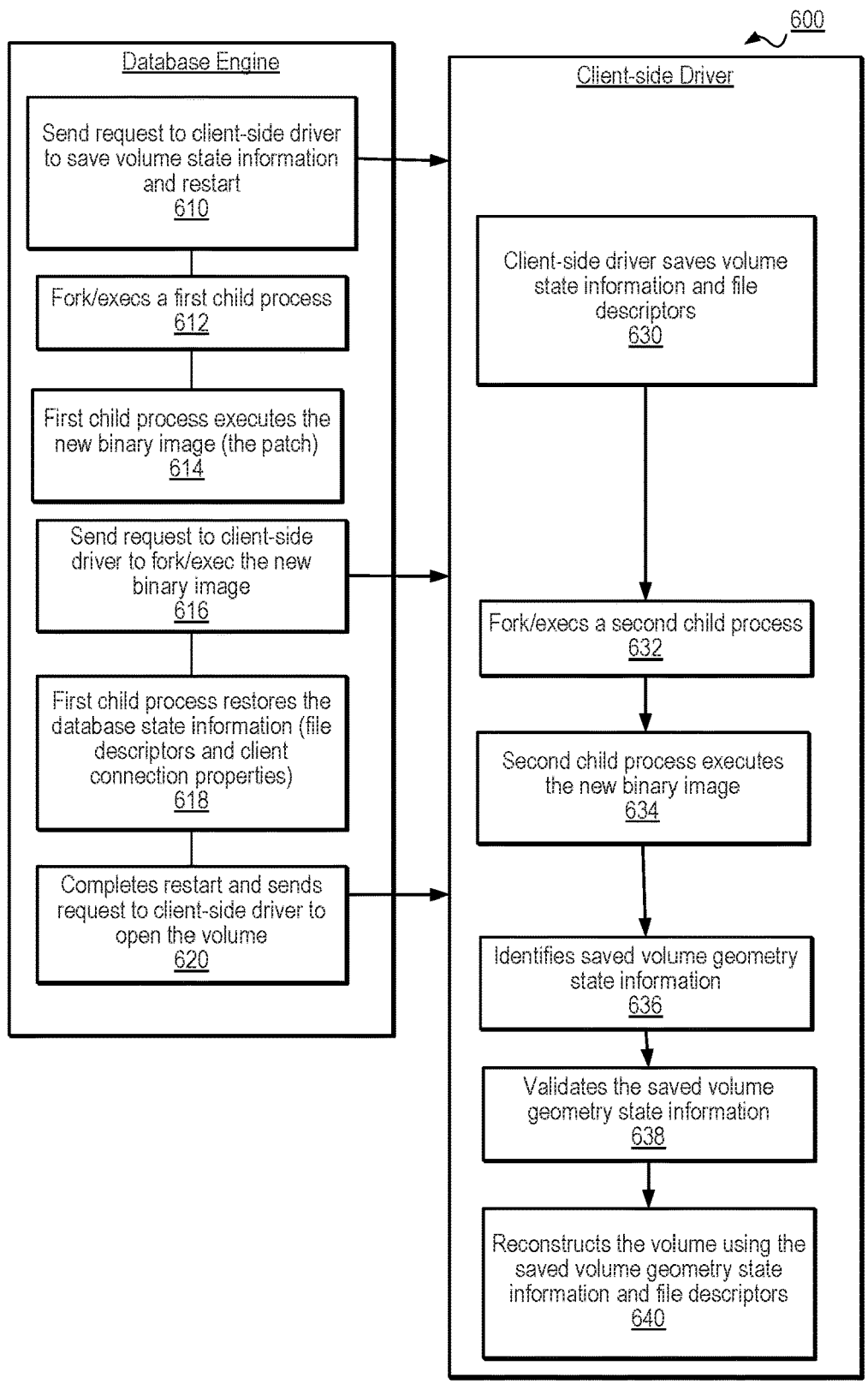
FIG. 6 is a block diagram and flowchart illustrating example functionality performed by a database engine and client-side driver in a managed downtime patching process, according to one embodiment.

FIG. 6 illustrates a flowchart that provides an example of a process 600 executed by a database management system (e.g., database management system 100 of FIG. 1 or database management system 200 of FIG. 2), according to various embodiments. In one embodiment, FIG. 6 illustrates a portion of the managed downtime patching process including interactions between a database engine (e.g., database engine 122 of FIG. 1) and a client-side driver (e.g., client-side storage service driver 124 of FIG. 1). In one embodiment, process 600 may represent a portion of the managed downtime patching process continuing from block 490 of FIG. 4. As shown in FIG. 6, various actions or functions performed by the database engine and client-side driver to enable the installation of a new binary image on a database instance without experiencing conventional application downtime. It is noted that certain functions shown in FIG. 6 may be performed in parallel with one another.

In block 610, the database engine sends a request to the client-side driver to save volume geometry state information and restart. As noted above, block 610 may the same as block 490 of FIG. 4, and may be performed as part of the identification of the safe checkpoint. In block 630, the client-side driver saves the volume state information and file descriptors. In one embodiment, the volume state information may be used to open and restore a volume. In one embodiment, the file descriptors provide a mapping to the socket information for the existing client connections.

In block 612, the database engine fork/execs a new or child process (also referred to as a "first child process") to execute the new binary image. In one embodiment, the UNIX fork/exec call allows a process to replace its runtime using the new process image (i.e., the updated database server binary image). In one embodiment, epoll, used to process client connections, continues to work with the new process (or child process created by the parent process as part of the fork/exec system call) using the preserved file descriptors (e.g., the file descriptors saved as part of the database state information in block 480 of FIG. 4). In block 614, the first child process executes the new binary image (e.g., the database engine executes the process binaries and libraries of the patch).

In block 616, the database engine sends a request to the client-side driver to fork/exec the new binary image. In blocks 632 and 634, the client-side driver fork/execs a new or child process (also referred to as a "second child process") and the second child process executes the new binary image.

In block 618, the first child process (executed by the database engine) restores the database state information (e.g., the previously saved file descriptors and client connection properties). In block 620, the database engine completes a restart using the new binary image executing the database state information and sends a request to the client-side driver to open the volume in a restore mode (e.g., opening the volume with the volume geometry state information restored to execute the new binary image and return the database instance to the state it was in prior to the managed downtime patching process).

In block 636, the client-side driver identifies the saved volume geometry state information. In block 638, the client-side driver validates the saved volume geometry state information. An example process for validating the saved volume geometry state information is described in greater detail below with respect to FIG. 9, according to one embodiment. In block 640, the client-side driver, executing the new binary image, reconstructs the volume using the saved volume geometry state information and the file descriptors. In one embodiment, the client-side driver uses the file descriptors to listen on the remote procedure call (RPC) channels to identity the client connection information relating to the waiting or pausing client connections.

Figure 7:
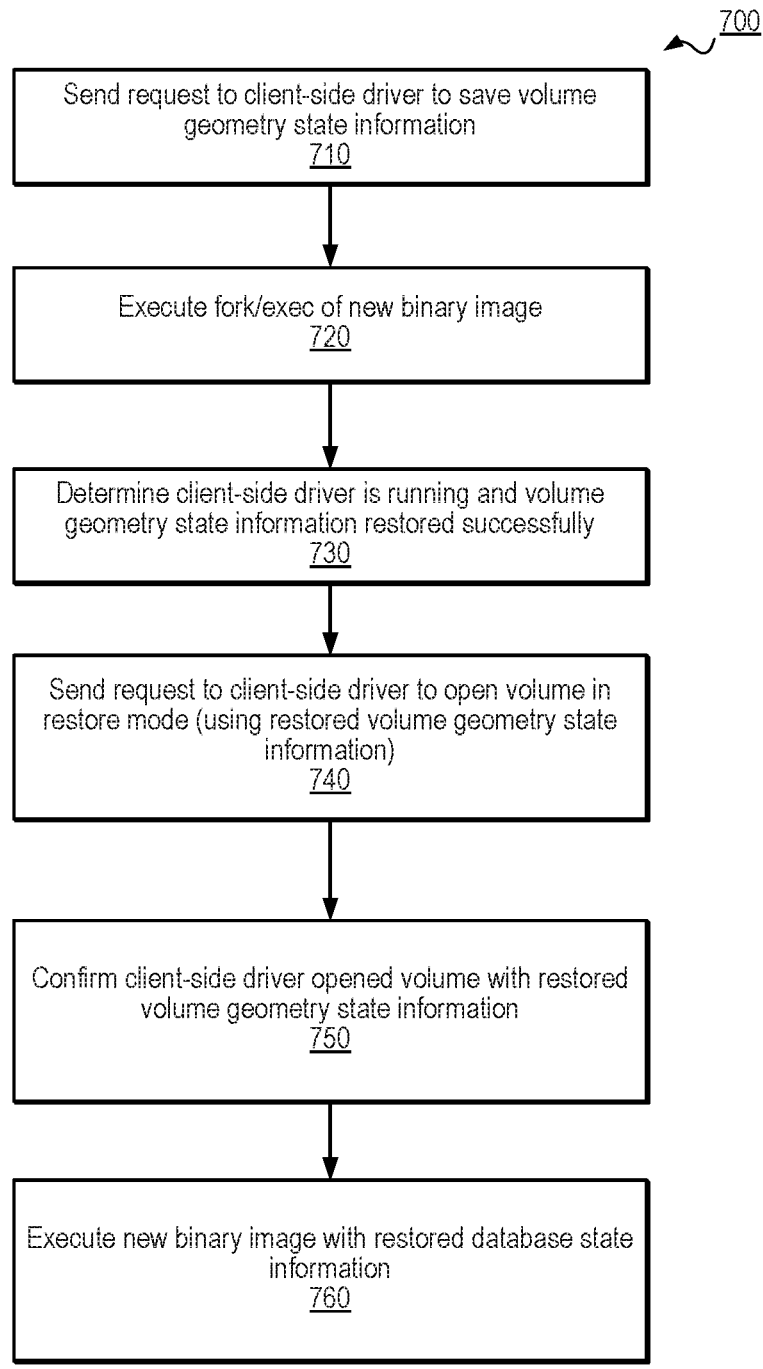
FIG. 7 is a flow diagram illustrating example functionality of a managed downtime patching process from a perspective of a database engine, according to one embodiment.

FIG. 7 illustrates a flowchart relating to an example process 700 executed by a database engine of a database management system (e.g., database engine 122 of database management system 100 in FIG. 1 or database engine 222 of database management system 200 of FIG. 2), according to various embodiments. In one embodiment, FIG. 7 illustrates functionality performed by a database engine during a managed downtime patching process.

In block 710, the database engine sends a request to a client-side driver to save volume state information. In one embodiment, the database engine may provide a hint or flag to the client-side driver to indicate the client-side driver is to open a volume in restore mode (i.e., restoring the volume with the saved volume geometry state information). In block 720, the database engine employs a fork/exec call to replace its runtime with the new binary image identified for the database instance. In block 730, the database engine determines that the client-side driver is running and has successfully restored the volume geometry state information.

In block 740, the database engine sends a request to the client-side driver to open the volume in restore mode (i.e., using the successfully restored volume geometry state information) and waits for the client-side driver to open the volume. In block 750, the database engine confirms the client-side driver opened the volume with the restored volume geometry state information. Upon confirming the opening of the restored volume, the database engine restores its state (i.e., the database state information) and executes the new binary image with the restored database state information, in block 760.

Figure 8:
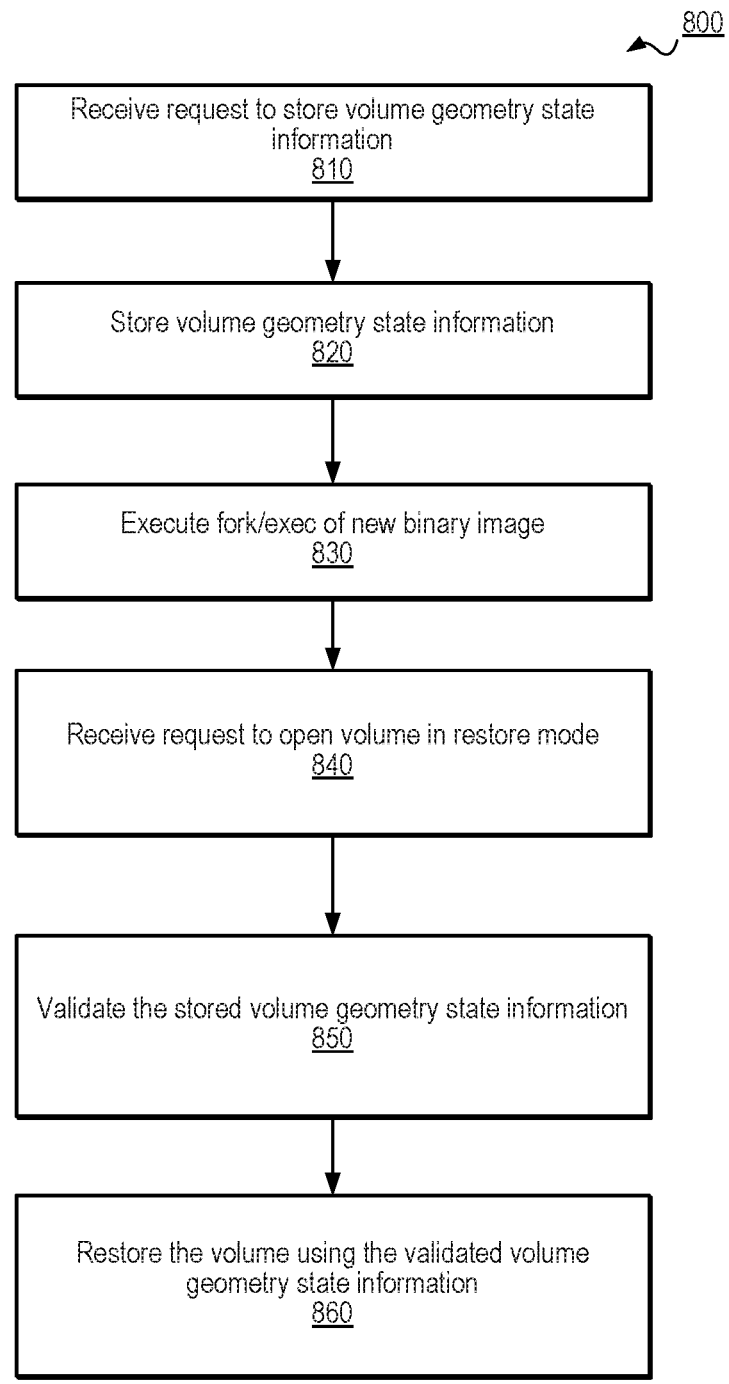
FIG. 8 is a flow diagram illustrating example functionality of a managed downtime patching process from a perspective of a client-side driver, according to one embodiment.

FIG. 8 illustrates a flowchart relating to an example process 800 executed by a client-side driver of a database instance of a database management system (e.g., client-side storage service driver 124 of database management system 100 in FIG. 1 or client-side driver 224 of database management system 200 of FIG. 2), according to various embodiments. In one embodiment, FIG. 8 illustrates functionality performed by a client-side driver during a managed downtime patching process.

In block 810, the client-side driver receives a request to store volume geometry state information. In one embodiment, the request is received from the database engine, as shown in FIG. 6. In block 820, the client-side driver stores the volume geometry state information to enable a later opening of a volume with the restored information. In block 830, the client-side driver employs a fork/exec call to fork/exec the new binary image. In block 840, the client-side driver receives a request (e.g., from the database engine) to open the volume in the restore mode (i.e., with the saved volume geometry state information).

Figure 9:
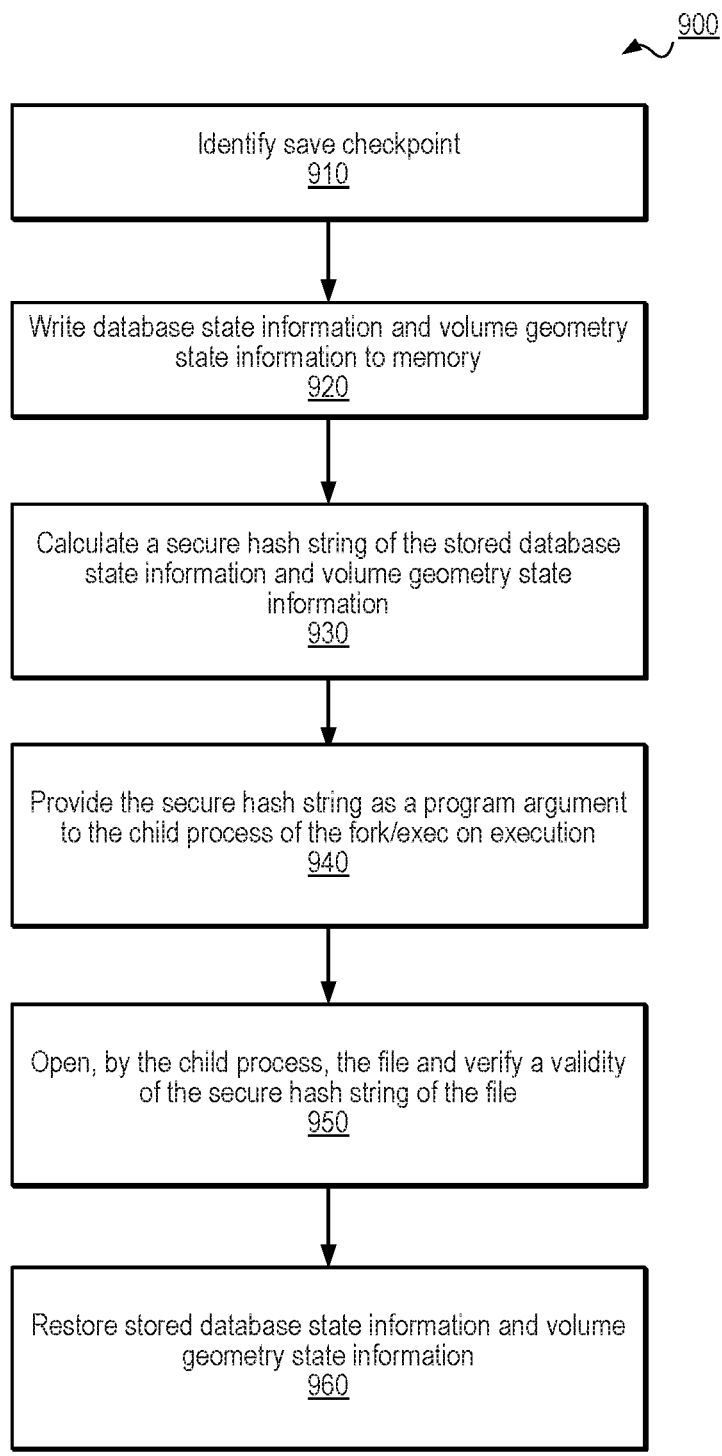
FIG. 9 is a flow diagram illustrating an example validation process, according to one embodiment.

In block 850, the client-side driver validates the stored volume geometry state information to ensure the integrity and accuracy of the information. FIG. 9 illustrates an example volume geometry state information validation process that may be performed by the client-side driver, according to one embodiment. In block 860, the client-side driver restores the volume using the validated volume geometry state information. In one embodiment, a notification or other message may be provided by the client-side driver to the database engine indicating that the volume has been successfully opened and restored, thus enabling the database engine to restore its state (as described above in connection with block 760 of FIG. 7).

FIG. 9 illustrates an example process 900 for validating database state information and volume geometry state information. In one embodiment, process 900 may be executed by one or more of a database engine and a client-side driver of a database instance of a database management system (e.g., database engine 122 and client-side storage service driver 124 of database management system 100 in FIG. 1 or database engine 222 and client-side driver 224 of database management system 200 of FIG. 2), according to various embodiments. In one embodiment, FIG. 9 illustrates functionality performed by a database engine and a client-side driver during a managed downtime patching process.

In block 910, a safe checkpoint (or state of inactivity) is identified. In one embodiment, the safe checkpoint may be identified according to process 400 of FIG. 4. In one embodiment, the safe checkpoint may be identified by the database engine and the entry into the safe checkpoint state may be communicated to the client-side driver by way of a message or notification. Upon recognizing or identifying that the safe checkpoint has been found, the database state information and the volume geometry state information are written to memory. In one embodiment, the database state information and the volume geometry state information are written to a temporary memory stream.

In block 930, a secure hash string is calculated of the database state information and the volume geometry state information. In one embodiment, a Secure Hash Algorithm 256 (SHA256) has may be calculated for the temporary memory stream to produce a fixed size 256-bit hash string. In block 940, the secure hash string is provided as a program argument to a child process of the fork/exec model (e.g., one or more of the first child process and the second child process). In one embodiment, one trusted process communicates the secure hash string to another trusted process via the program arguments. In block 950, the child process opens the file (e.g., the SHA256.mdp file) and verifies the secure hash string of the file. If the secure hash string is valid, the stored database state information and volume geometry state information are restored, in block 960.

Figure 10:
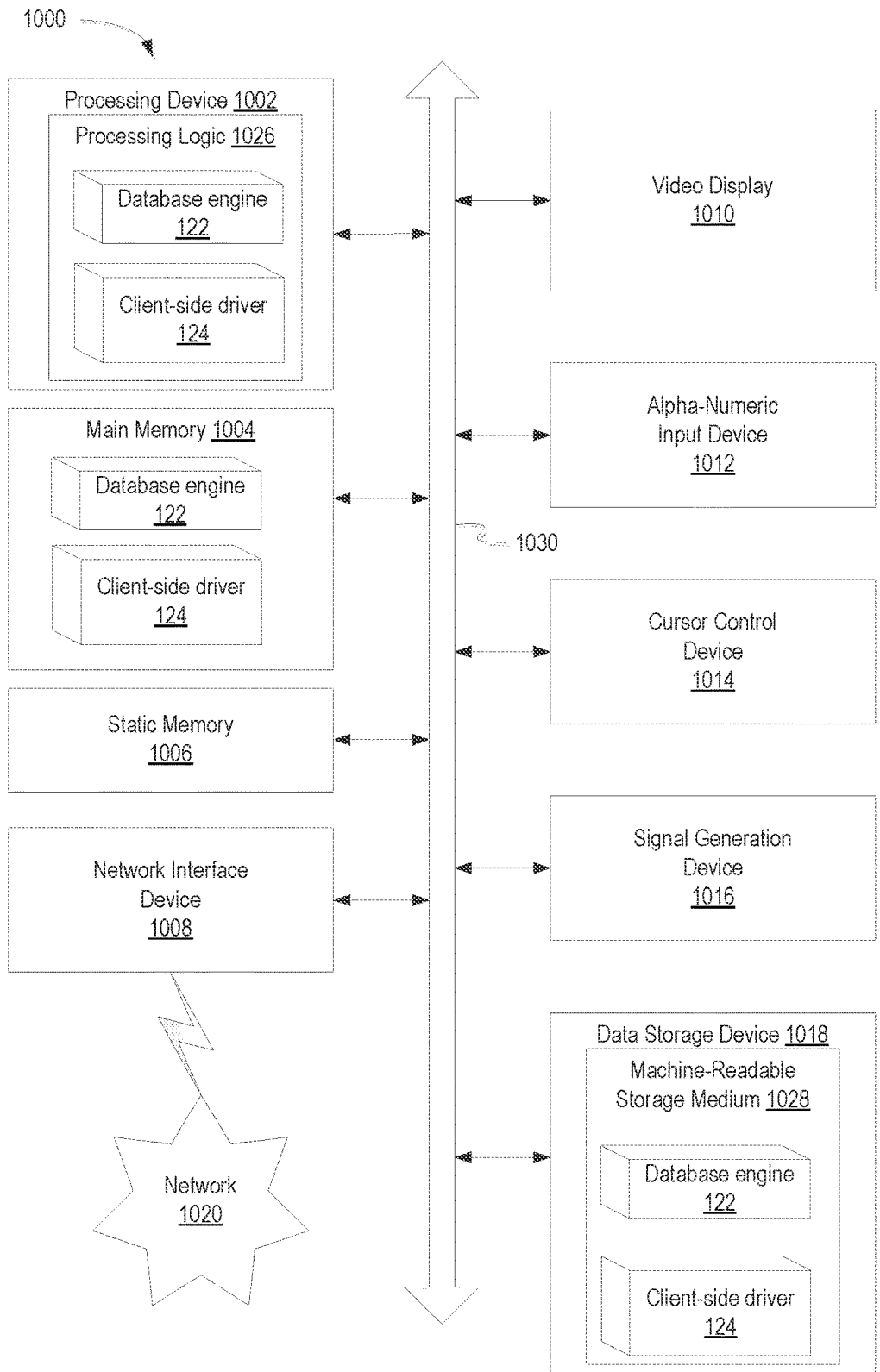
FIG. 10 is a schematic block diagram that provides an example illustration of a computing environment executing instructions relating to testing candidate code, according to one embodiment.

FIG. 10 illustrates a diagrammatic representation of a machine in the example form of a computer system 1000 including a set of instructions executable by a database engine 122 and a client-side driver 124 to cause the system to perform any one or more of the methodologies discussed herein. In one embodiment, the instructions 1050 may enable execution of a database instance including a database engine and a client-side driver (e.g., database engine 122, 222 and client-side driver 124, 224). In one embodiment, the instructions may enable execution of the processes shown and described in connection with FIGS. 3-9.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. In one embodiment, computer system 500 may represent at least a portion of the database management system 100 of FIG. 1.

The example computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In various implementations of the present disclosure, the processing device 1002 is configured to execute instructions for a database engine and client-side driver for performing the operations and processes described herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable medium 1028 on which is stored one or more sets of instructions of the code testing system 100 embodying any one or more of the methodologies or functions described herein. The instructions may also reside, completely or at least partially, within the main memory 1004 and/or within processing logic 1026 of the processing device 1002 during execution thereof by the computer system 1000, the main memory 1004 and the processing device 1002 also constituting computer-readable media.

The instructions may further be transmitted or received over a network 1020 via the network interface device 1008. While the computer-readable storage medium 1028 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely presented as examples. Particular implementations may vary from these example details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "saving", "pausing", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a database engine of a database instance executed by a processing device, a request to initiate installation of a new binary image on the database instance;
identifying, by the database engine, a safe checkpoint to initiate the installation, wherein the safe checkpoint represents a state wherein there are no active database connection requests associated with the database instance and an instruction is sent to a scheduler to pause one or more new database connection requests associated with a storage layer of the database instance;
saving, by the database engine, database state information comprising:
one or more server file descriptors comprising information identifying sockets used in existing client connections with the storage layer of the database instance; and
client connection properties associated with the existing client connections with the storage layer of the database instance;
pausing the one or more new database connection requests associated with the storage layer of database instance;
saving, by a client-side storage service driver operatively coupled to the database engine, volume geometry state information comprising an IP address of a storage device associated with the database instance;
restarting by the database engine and the client-side storage service driver;
executing, by the database engine, the new binary image using a first fork/exec call;
executing, by the client-side storage service driver, the new binary image using a second fork/exec call;
reconstructing, by the client-side driver, a volume of a storage layer of the database instance using the volume geometry state information; and
restoring, by the database engine executing the new binary image, the database state information.

2. The method of claim 1, further comprising validating, by the client-side driver, the volume geometry state information.

3. The method of claim 1, wherein identifying the safe checkpoint further comprises determining a highest allocated logical sequence number equals a current volume durable logical sequence number.

4. A system comprising:
a processing device; and
memory to store computer-executable instructions that, if executed, cause the processing device to:
receive, by a database engine executed by the processing device, a first request to initiate a patch comprising a new binary image for a database instance;
determine there are no active database connection requests received from a client process;
send an instruction to a scheduler to prevent scheduling of new incoming connection requests;
determine threads executing one or more processes in a background are idle;
determine a set of patch restart conditions are satisfied;
shut down interaction with an operating system kernel for an existing client connection to a storage layer of the database instance;
save database state information;
send a second request to a client-side storage service driver to save volume geometry state information and restart; and
execute a call to generate a process to:
restore database state information comprising at least one of a client connection property or a file descriptor comprising socket information associated with a client connection; and
execute the new binary image.

5. The system of claim 4, wherein the set of patch restart conditions comprises at least one of an active temporary table count equals zero, a table level lock count equals zero, a user level lock count equals zero, a global read lock count equals zero, or an active secure socket layer (SSL) connection count equals zero.

6. The system of claim 4, wherein the shut down of interaction with the operating system kernel comprises shut down of an epoll application programming interface (API) for the existing client connection.

7. The system of claim 4, wherein the first request to initiate the patch of the database instance is received from a database monitoring agent operatively coupled to the database instance.

8. The system of claim 4, wherein the call comprises a first fork/exec call.

9. The system of claim 4, the processing device to identify a socket used in a first existing client connection using the socket information comprised in the file descriptor.

10. The system of claim 4, wherein the client connection property comprise at least one of a username associated with a client connection, a hostname of a client machine associated with the client connection, an access privilege of a user associated with the client connection, an IP address of a client machine associated with a client connection, a database name opened in a session of the client connection, a client connection file descriptor, or a session variable.

11. The system of claim 4, the processing device to determine the client-side storage service driver restored the volume geometry state information.

12. The system of claim 11, the processing device to send a third request to the client-side storage service driver to open a volume using the volume geometry state information that was restored by the client-side storage service driver.

13. The system of claim 12, the processing device to confirm the client-side driver opened the volume with the volume geometry state information that was restored.

14. The system of claim 4, the processing device to execute the new binary image with the database state information.

15. The system of claim 14, wherein the new binary image is executed with no downtime of an application associated with the database instance.

16. A non-transitory computer-readable storage device storing computer-executable instructions that, if executed by a processing device, cause the processing device to:
receive a first request to store volume geometry state information associated with a volume of a storage layer associated with a database instance;
store the volume geometry state information;
execute a fork/exec call to generate a child process a new binary image of the database instance;

receive a second request to open the volume in a restore mode, wherein the volume is restored with the volume geometry state information;

calculate a secure hash string of the volume geometry state information;

verify, by the child process, a validity of the secure hash string;

validate the volume geometry state information; and restore the volume using validated volume geometry state information.

17. The non-transitory computer-readable storage device of claim 16, the processing device to:

write the volume geometry state information to a memory.

18. The non-transitory computer-readable storage device of claim 17, the processing device to:

provide the secure hash string as a program argument to the child process on execution.

19. The non-transitory computer-readable storage device of claim 16, the volume geometry state information comprises at least one of an IP address of a storage device associated with the database instance or storage partition metadata.

* * * * *